(12) United States Patent
Asada (10) Patent No.: US 6,222,611 B1
(45) Date of Patent: Apr. 24, 2001

(54) MULTI-BEAM IMAGE FORMING APPARATUS AND METHOD CAPABLE OF PRECISELY CONTROLLING IMAGE WRITING START POSITION

(75) Inventor: Kenichiroh Asada, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/362,718

(22) Filed: Jul. 29, 1999

(30) Foreign Application Priority Data

Jul. 29, 1998 (JP) .................................................. 10-213999
Jul. 29, 1998 (JP) .................................................. 10-214000

(51) Int. Cl.$^7$ ................................ G03B 27/72; H01J 3/14
(52) U.S. Cl. ............................. 355/35; 250/235; 347/235
(58) Field of Search ............................... 355/35, 67, 7 C; 399/22 C; 359/204, 21 C, 216; 250/235; 347/235

(56) References Cited

U.S. PATENT DOCUMENTS

| | | | |
|---|---|---|---|
| 5,578,819 | * 11/1996 | Kataoka et al. ...................... | 250/235 |
| 5,821,978 | * 10/1998 | Yamamoto et al. .................. | 347/235 |
| 5,834,766 | * 11/1998 | Suhara .................................. | 250/234 |
| 5,965,869 | * 10/1999 | Masuda et al. ....................... | 250/205 |
| 5,966,231 | * 10/1999 | Bush et al. ............................ | 359/204 |
| 5,999,345 | * 12/1999 | Nakajima et al. .................... | 359/821 |
| 6,084,699 | * 7/2000 | Shiraishi et al. ...................... | 359/204 |

FOREIGN PATENT DOCUMENTS

| | | |
|---|---|---|
| 57-8887 | 1/1982 | (JP) . |
| 6-206343 | 7/1994 | (JP) . |

* cited by examiner

Primary Examiner—Russell Adams
Assistant Examiner—Rodney Fuller
(74) Attorney, Agent, or Firm—Oblon, Spivak, McClelland, Maier & Neustadt, P.C.

(57) ABSTRACT

An image forming apparatus records an image on a recording medium by scanning the recording medium with a plurality of beams modulated according to individual information signals. A beam detect device detects the plurality of beams arriving at respective predetermined positions and generates a plurality of beam detect signals corresponding to the plurality of beams, respectively, and a beam detect signals separating device separates the plurality of beam detect signals into individual beam detect signals. An image formation start timing for each beam is controlled according to each beam detect signal separated from others by the beam detect signals separating device. The beam detect signals separating device to includes a delaying device to delay the plurality of beam detect signals from the beam detect device, a separating device to separate the plurality of beam detect signals corresponding to the plurality of beams into individual detect signals by generating a plurality of masking signals corresponding to the plurality of beam detect signals according to signals from the delaying device and by masking the plurality of beam detect signals from the beam detect device with the plurality of masking signals, respectively, and a delay time setting device to set and change a delaying time of the delaying device.

11 Claims, 6 Drawing Sheets

MULTI-BEAM IMAGE FORMING APPARATUS AND METHOD CAPABLE OF PRECISELY CONTROLLING IMAGE WRITING START POSITION

RELATED APPLICATIONS

This document claims priority and contains subject matter related to Japanese Patent Application Nos. 10-213999 and 10-214000 filed in the Japanese Patent Office on Jul. 29, 1998 respectively, and the entire contents of which are hereby incorporated by reference.

BACKGROUND OF THE INVENTION

1. Field of the Invention

The present invention relates to an image forming apparatus such as a copying machine or a printer, that records an image on a recording medium by scanning the recording medium with a plurality of beams.

2. Discussion of the Background

In an image forming apparatus, such as for example, a digital copying machine or a printer, it is well known that information is recorded on a recording medium by scanning the recording medium with a single beam. A beam modulated according to an information signal is deflected by a rotating polygon mirror or the like so as to scan a surface of the recording medium in a sub-scanning direction, repeatedly in a main scanning direction. In such an image forming apparatus, the scanning beam from the polygon mirror is detected by a beam detector placed in a position out of a recording area of the recording medium and start of image formation with the scanning beam on the recording medium is controlled according to a beam detect signal from the beam detector.

It is also known that information is recorded on a recording medium by a plurality of scanning beams, which are independently modulated according to individual information and which are simultaneously deflected by a rotating polygon mirror or the like. The plurality of scanning beams scan a surface of the recording medium in a sub-scanning direction, repeatedly in a main scanning direction. In such an image forming apparatus using a plurality of beams, the beams are respectively detected by a plurality of beam detectors placed in a position out of a recording area of the recording medium, and start of image formation on the recording medium with each scanning beam is controlled according to a corresponding beam detect signal from the plurality of beam detectors.

Japanese Laid-open Patent Publication No. Sho57-8887 describes a method of controlling a start position for writing image information on a recording medium in an image forming apparatus which writes information by scanning the recording medium with a plurality of beams. In this method, a timing signal for each beam is generated by comparing a beam detect signal to a threshold level, and a start position to start writing image information is controlled according to the generated timing signal.

Japanese Laid-open Patent Publication No. Hei 6-206343 describes another control method for an image forming apparatus in which information is recorded by scanning a recording medium with a plurality of beams from semiconductor lasers. In this method, a synchronizing signal for each beam is generated by controlling on/off state of the semiconductor lasers by using a clock cycle which is shorter than a picture element clock cycle, and start of image formation with each beam is controlled according to the synchronizing signal generated for each beam.

In an image forming apparatus in which information is recorded by scanning a recording medium with a single beam, when recording the information at high speed or at high resolution, because a beam modulated according to an information signal is deflected by a rotating polygon mirror or the like so as to scan a surface of the recording medium in a sub-scanning direction, repeatedly in a main scanning direction, it is necessary to increase the transmission speed of the information signal for modulating the beam.

Also, because the scanning speed for the main scanning direction must be increased for accomplishing high speed or high resolution recording, when a rotating polygon mirror is used for deflecting the beam, the rotating speed of the polygon mirror must be increased, for example, to several tens of thousands rpm, which is hard to realize due to structural limitations.

Figure 5:
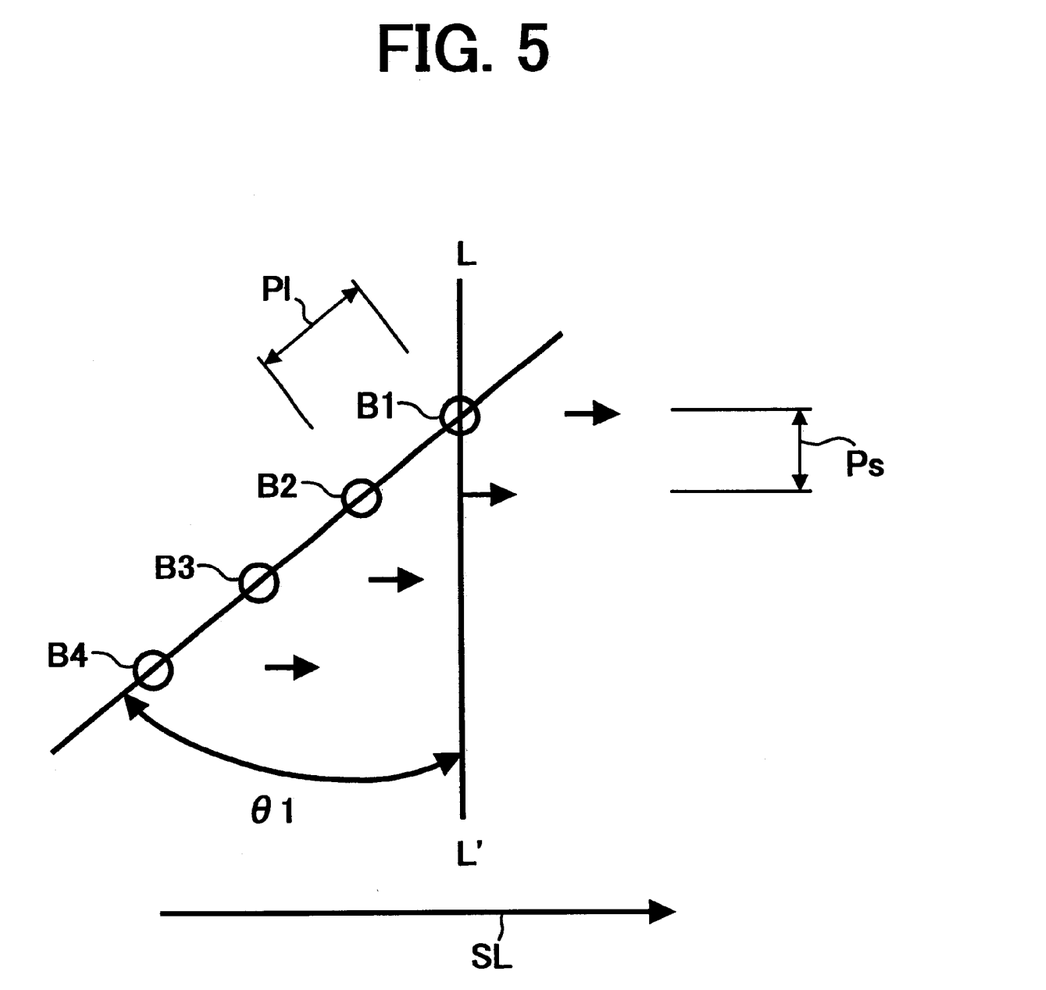
FIG. 5 is a schematic drawing illustrating an exemplary construction of a multi-beam optical system.

The above-described image forming apparatus using a plurality of scanning beams has been proposed to solve the difficulties in accomplishing high speed or high resolution recording with a single beam. In such an image forming apparatus using a plurality of scanning beams, it is necessary to dispose the plurality of beams at intervals that are is substantially the same as those of picture elements to be formed on a surface of a recording medium. However, the interval of light emitting points of a semiconductor laser (which is generally used as a light source for emitting the plurality of beams) is generally broader than the interval of picture elements for recording information with a generally desired writing resolution of 600 dpi. Therefore, as illustrated in FIG. 5, when a light emitting points interval P1 is greater than a picture elements interval Ps, the beam interval on the recording medium is made the same as the picture elements interval Ps by slanting the arrangement of the light emitting points for the beams B1–B4 by a predetermined angle relative to a line L–L' which is perpendicular to the main scanning direction SL.

Figure 6:
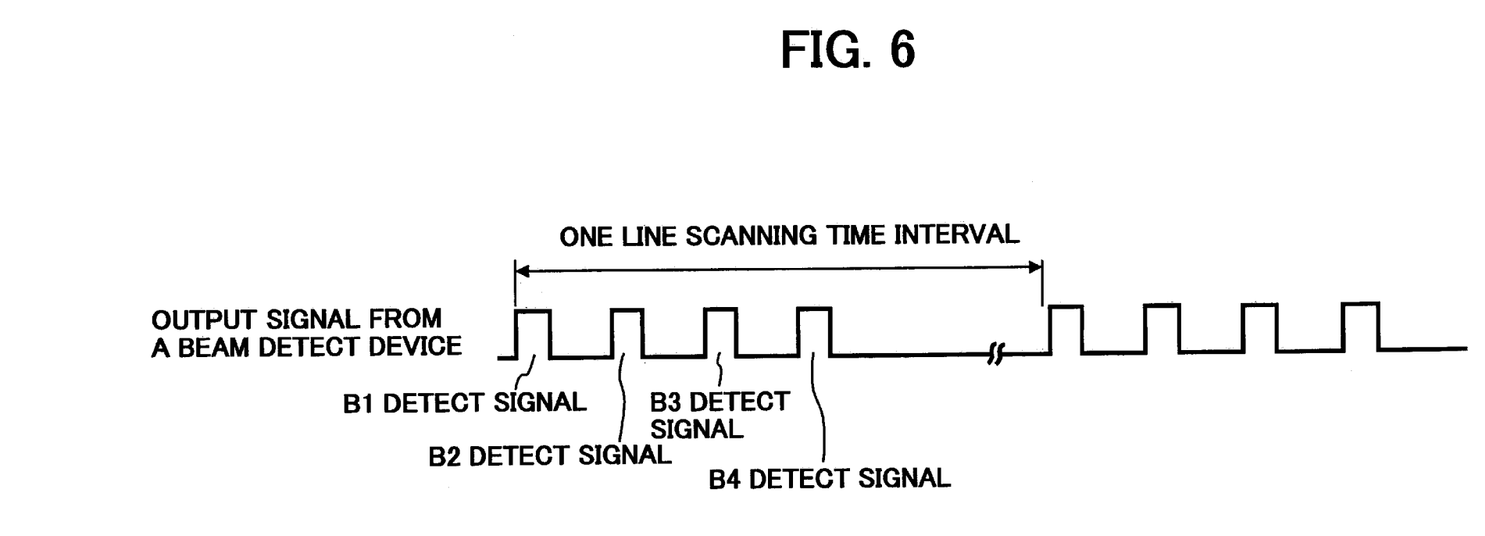
FIG. 6 is a diagram illustrating an exemplary signal wave-form of the multi-beam optical system.

However, in a multi-beam optical system in which a plurality of beams are disposed closely to each other as described above for writing information at high resolution, when the writing resolution is, for example, 600 dpi, the beams interval Ps must be adjusted to about 42.3 $\mu$m. This makes it hard to dispose a plurality of detecting elements on a scanning optical path to detect each beam. Therefore, generally, the plurality of beams scan a single detecting element, and a detect signal for each beam is generated by the single detecting element in a manner as illustrated in FIG. 6. In order to align the image formation start point of each beam with each other beam in a precise manner on a recording medium, the plurality of beam detect signals from the single beam detecting element, corresponding to the plurality of beams, respectively, must be separated from each other in a precise manner, because the image formation start position of each beam modulated according to an information signal must be determined based upon the beam detect signal for each beam.

In the writing start position control method described in JP No. Sho 57-8887, a timing signal for each beam is generated by comparing a beam detect signal to a beam detect device with a threshold level, and controlling the writing start position according to the timing signal. However, because the threshold level for the detect signal is set with an analogue value, generation of the timing signal tends to be influenced by variation of the power of an electric source and variation of the power for each beam, and thereby accuracy in the writing start position is decreased.

In the image forming apparatus described in JP No. Hei 6-206343, a synchronizing signal for each beam is generated by controlling the on/off state of a semiconductor laser by using a clock cycle which is shorter than a clock cycle for picture elements, and start of image formation with each beam is controlled according to the synchronizing signal for each beam. Therefore, high frequency oscillator is necessary for generating the clock for controlling on/off of the semiconductor laser, and thereby a control circuit must be configured with elements suitable for a high frequency, such as a flip-flop type circuit. This increases the cost of the apparatus and also causes a problem of large electromagnetic interference waves.

SUMMARY OF THE INVENTION

In order to overcome the above-described and other problems with prior art devices, preferred embodiments of the present invention provide a novel image forming apparatus and a novel image forming method that are capable of controlling an image information writing start position in a precise manner at low cost. In addition, the image forming apparatus and method are capable of preventing noise, accurately controlling the image writing start position, and obtaining a good quality image in a stable manner.

Further, the preferred embodiments of the present invention provide a novel image forming apparatus and a novel image forming method that are capable of separating a plurality of beam detect signals in a precise manner and controlling the image writing start is position to be at an optimum position even when the rate of rotation of a rotating polygon mirror is changed, for example, according to a change of writing resolution.

According to a preferred embodiment of the present invention, an image forming apparatus records an image on a recording medium by scanning the recording medium with a plurality of beams modulated according to individual information signals. A beam detect device detects the plurality of beams arriving at respective predetermined positions on the beam detect device and generates a plurality of beam detect signals corresponding to the plurality of beams, respectively, and a beam detect signals separating device separates the plurality of beam detect signals into individual beam detect signals. An image formation start timing for each beam is controlled according to each beam detect signal separated from others by the beam detect signals separating device.

According to the present invention, the beam detect signals separating device may include a delaying device to delay the plurality of beam detect signals from the beam detect device and a separating device to separate the plurality of beam detect signals corresponding to the plurality of beams into individual detect signals. The plurality of beam detect signals are separated by generating a plurality of masking signals corresponding to the plurality of beam detect signals according to signals from the delaying device and by masking the plurality of beam detect signals from the beam detect device with the plurality of masking signals, respectively. The beam detect signals separating device may further include a delay time setting device to set and change a delaying time of the delaying device.

Further, the image forming apparatus of the present invention may include a rotating polygon mirror to deflect the plurality of beams, and a setting device to set and change the rate of rotation of the rotating polygon mirror. The delay time setting device changes the delaying time according to the rate of rotation of the rotating polygon mirror.

The image forming apparatus of the present invention may also include a control device to turn off a beam of the plurality of beams incident on the beam detect device and to turn on a subsequent beam of the plurality of beams, immediately after the initial beam is detected by the beam detect device.

BRIEF DESCRIPTION OF THE DRAWINGS

A more complete appreciation of the present invention and many of the attendant advantages thereof will be readily obtained as the same becomes better understood by reference to the following detailed description thereof when considered in conjunction with accompanying drawings, wherein.

DESCRIPTION OF THE PREFERRED EMBODIMENTS

An embodiment of the present invention will now be described in detail with reference to the drawings.

Figure 1:
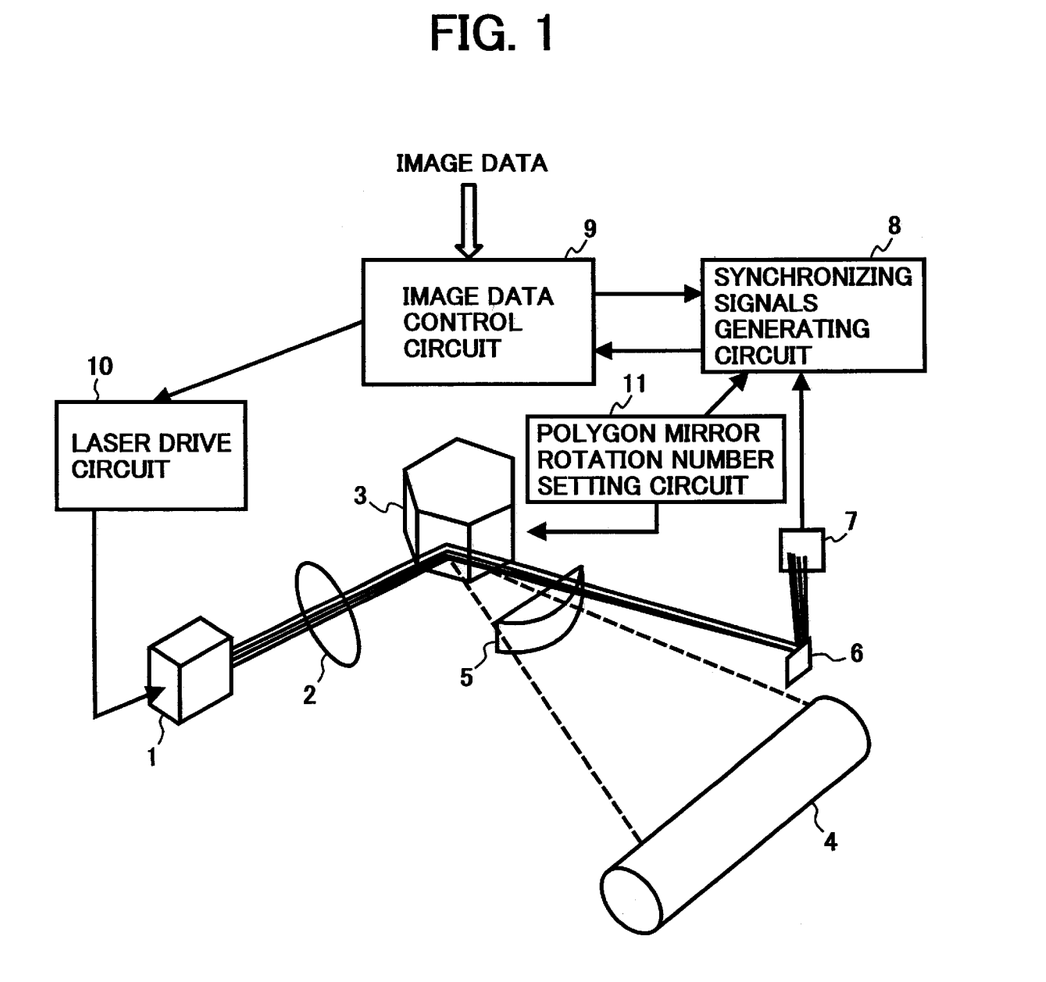
FIG. 1 is a schematic drawing illustrating an image writing part of an image forming apparatus according to an embodiment of the present invention.

In FIG. 1, a light source unit 1 includes, for example, a laser array unit in which a plurality of semiconductor lasers are arranged in a row. The light source unit 1 emits a plurality of beams, for example, four beams. The beams from the light source unit 1, which are diverging, are converted to parallel beams by a condensing lens 2. The beams passed through the condensing lens 2 are deflected by a rotating polygon mirror 3 such that the deflected beams scan a surface of a photoconductor (recording medium) 4 in parallel to each other, substantially simultaneously, and repeatedly in a main scanning direction.

The plurality of beams from the rotating polygon mirror 3 are imaged on a surface of the photoconductor 4 with a fθ lens 5. As the photoconductor 4, for example, a photoconductive drum is used, and the photoconductor 4 is rotated by a driving unit including a motor (not shown). A reflecting mirror 6 is placed in a position out of a recording area of the photoconductor 4 so as to deflect the plurality of beams from the rotating polygon mirror 3 to a beam detect device 7. The reflecting mirror 6 deflects the beam from the fθ lens 5 toward the beam detect device 7.

When the beams from the fθ lens 5 are incident on an edge of the beam detect device 7, the beam detect device 7 starts to detect the beams and generates a beam detect signal. The beam detect signal from the beam detect device 7 is input into a synchronizing signal generating circuit 8. The synchronizing signal generating circuit 8 separates a plurality of beam detect signals, corresponding to a plurality of beams, into individual beam detect signals for the beams, and generates respective synchronizing signals for the beams.

An image data control circuit 9 outputs image data as information signals to modulate the plurality of beams in accordance with the plurality of synchronizing signals corresponding to the plurality of beams, to a laser drive circuit 10 and thereby controls the image formation start position of each beam in accordance with the corresponding synchronizing signal. Thus, the image writing start positions of the beam are accurately aligned with each other even though the photoconductor 4 is scanned with the plurality of beams.

The laser drive circuit 10 drives the plurality of semiconductor lasers in the light source unit 1 to modulate the plurality of beams according to image data from the image data control circuit 9. The plurality of semiconductor lasers emit beams individually modulated according to respective image data. The rotating polygon mirror 3 is driven to rotate by a motor (not shown). The motor rotates the polygon mirror 3 according to the rate of rotation set by a polygon mirror rotation number setting circuit 11.

Figure 2:
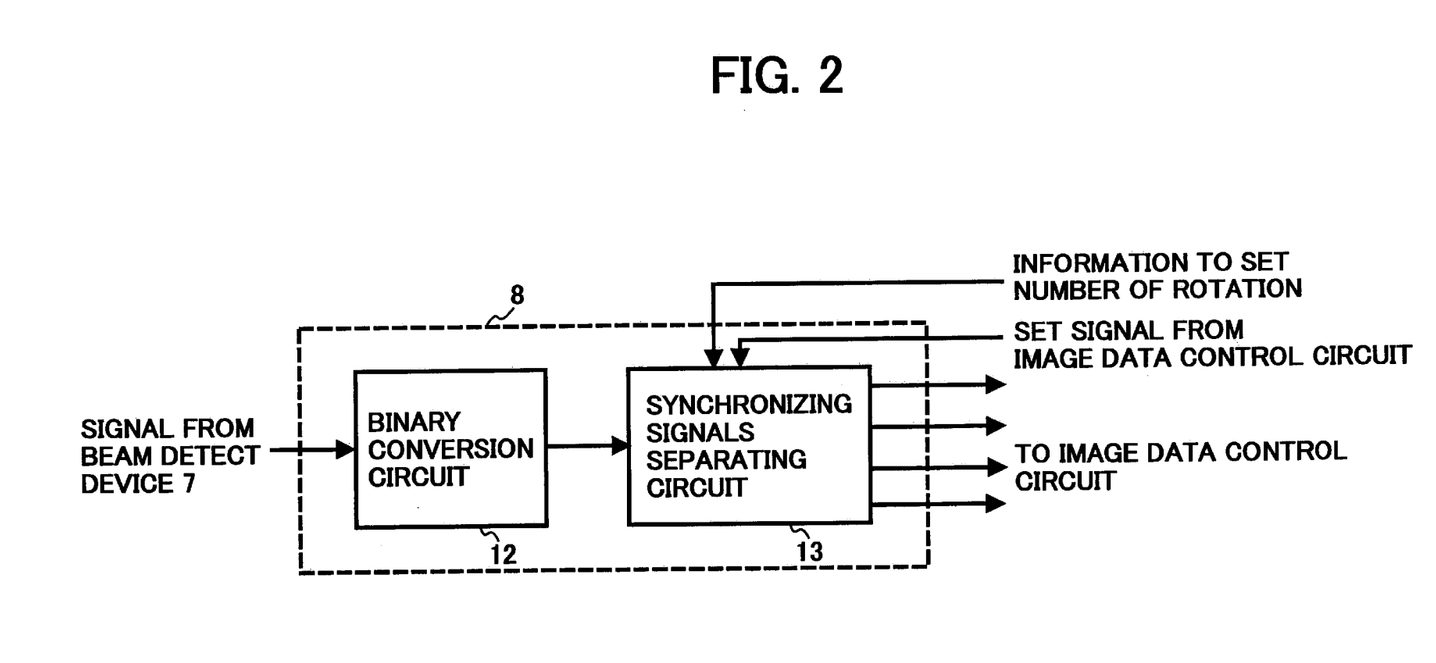
FIG. 2 is a block diagram illustrating an exemplary construction of a synchronizing signals generating circuit of the image forming apparatus.

FIG. 2 illustrates an exemplary construction of the synchronizing signals generating circuit 8. A beam detect signal from the beam detect device 7 is converted to binary data by a binary conversion circuit 12 and is then shaped to a pulse signal as illustrated in FIG. 6. The beam detect signal from the binary conversion circuit 12 is a continuous pulse signal continuing for the number of beams emitted from the light source 1, and is generated for each scanning line of the rotating polygon mirror 3. A synchronizing signals separating circuit 13 separates the beam detect signals, from the binary conversion circuit 12, into individual detect signals for the beams and generates respective synchronizing signals.

Figure 3:
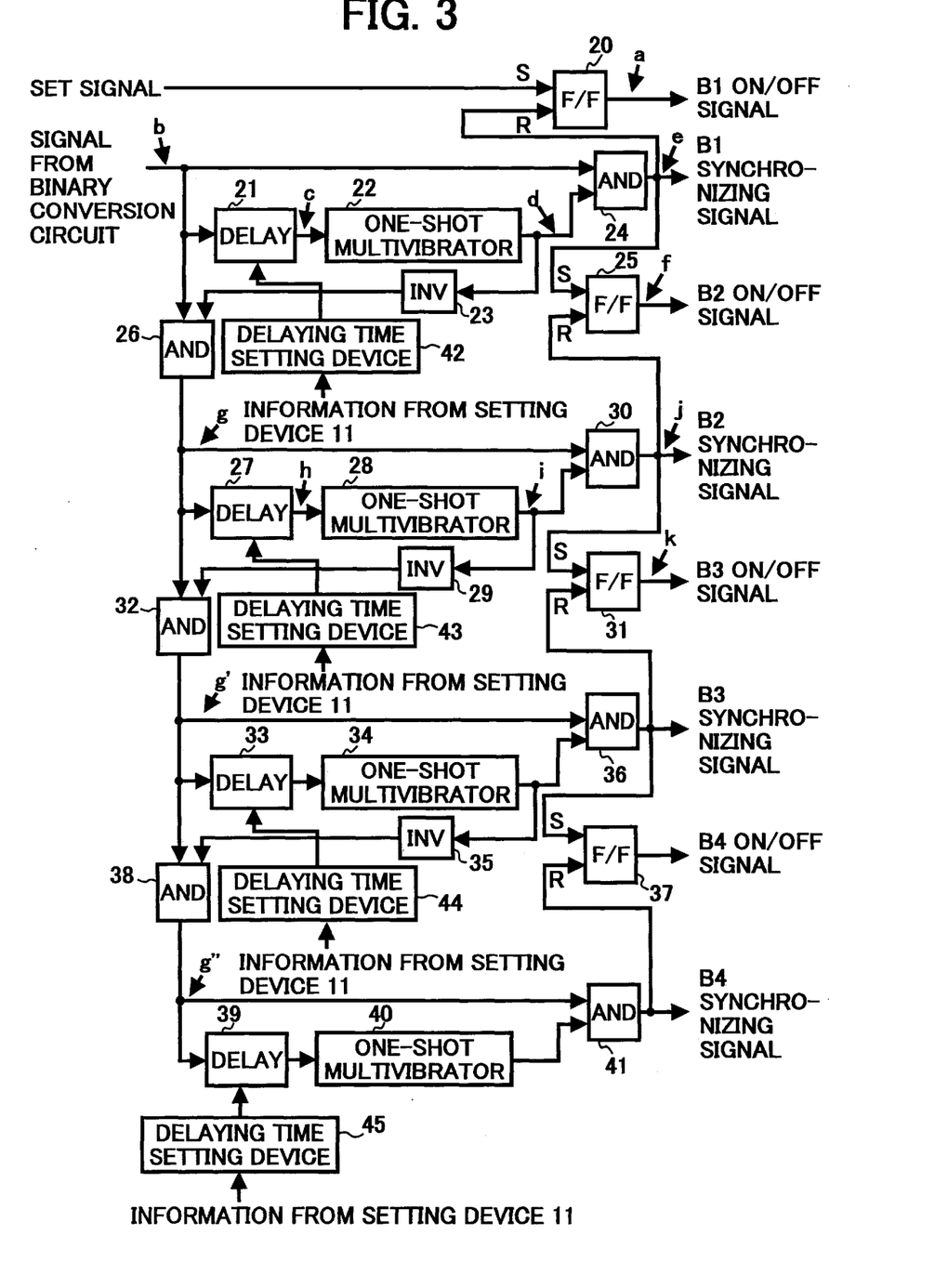
FIG. 3 is a block diagram illustrating an exemplary construction of a synchronizing signals separating circuit of the synchronizing signals generating circuit.
Figure 4:
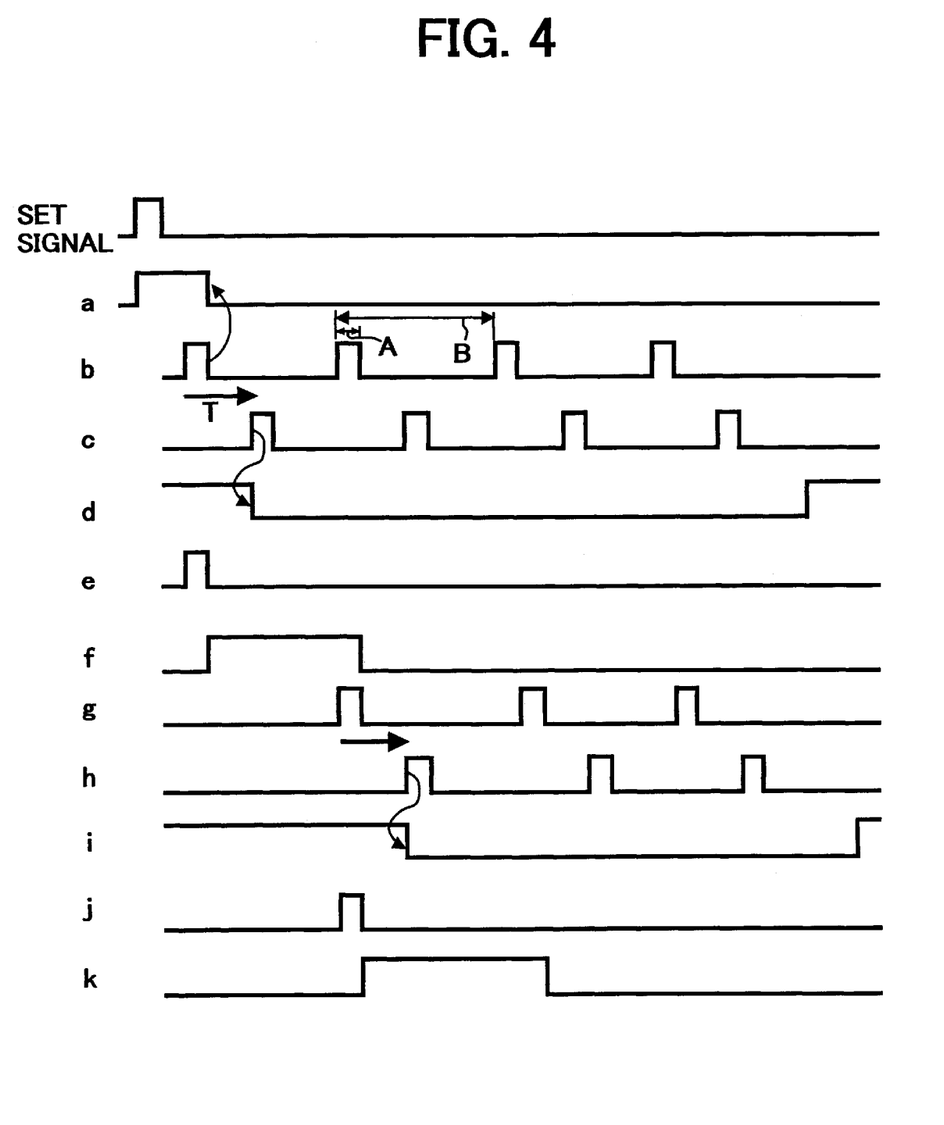
FIG. 4 is a timing chart illustrating an operation of the synchronizing signals separating circuit.

FIG. 3 illustrates an exemplary construction of the synchronizing signals separating circuit 13 and FIG. 4 illustrates operation timings of the synchronizing signals separating circuit 13. A set signal is generated by the image data control circuit 9 by measuring a timing immediately before detecting a subsequent beam with the beam detect device 7 based upon a synchronizing signal generated by the synchronizing signals generating circuit 8 when a preceding line is scanned.

First, an operation for the first beam B1 is described. A RS-flip-flop (hereinafter called F/F) 20 operates as a control device to turn on/off the first beam B1. The F/F is set by a SET signal from the image data control circuit 9 and the level of an output signal "a" becomes high. The output signal "a" of the F/F 20 is output to the image data control circuit 9 as an ON/OFF signal to turn on/off the first beam B1. The image data control circuit 9 outputs the ON/OFF signal "a" from the F/F 20 to the laser drive circuit 10 as a modulation signal for detecting the first beam B1. The laser drive circuit 10 drives a first semiconductor laser of the light source unit 1 according to the modulation signal "a" for detecting the first beam B1 from the image data control circuit 9 and thereby the first semiconductor laser is turned on to emit the first beam B1.

When the first beam B1 passes the beam detect device 7, a beam detect signal "b" is output by the binary conversion circuit 12. The beam detect signal "b" from the binary conversion circuit 12 is delayed for a minute period of time by a delay circuit 21 and becomes a delayed signal "c". The beam detect signal "b" is delayed for a time which is shorter than a time from the time when the first beam B1 passes the beam detect device 7 until a following beam B2 passes the beam detect device 7. The level of an output signal from a one-shot multivibrator 22 is made low by a rising edge of a first pulse signal of the output signal "c" from the delay circuit 21. The level of the output signal of the one-shot multivibrator 22 is thereafter kept low during a predetermined period of time set with the one-shot multivibrator 22 and is then made high.

The above time set with the one-shot multivibrator 22 is made sufficiently longer than a time for all of the plurality of beams B1–B4 to pass through the beam detect device 7 when the rotating polygon mirror 3 is rotating at a normal rotating speed. The one-shot multivibrator 22 and an inverter 23 constitute a masking signal generating device.

A gate device 24 includes an AND gate and inputs an output signal from the one-shot multivibrator 22 as a gate signal (masking signal). Respective beam detect signals "b" corresponding to beams B1–B4 from the binary conversion circuit 11 are gated (masked) by the gate signal and thereby a beam detect signal corresponding to the first beam B1 is separated from others and is output to the F/F 20 and the image data control circuit 9 as a synchronizing signal "e" corresponding to the first beam B1. The F/F 20 is reset by the output signal "e" from the AND gate 24 and thereby the first beam B1 is turned off.

The image data control circuit 9 outputs image data to modulate the first beam B1 to the laser drive circuit 10 in synchronism with the synchronizing signal "e" from the AND gate 24 (a predetermined time later than the synchronizing signal "e") and thereby controls the image formation start timing with the first beam B1 based upon the synchronizing signal "e". The laser drive circuit 10 drives the first semiconductor laser of the light source unit 1 according to the image data to modulate the first beam B1, and thereby the first beam B1, modulated according to the image data, is emitted.

A F/F 25 operates as a control device to turn on/off a second beam B2. The F/F is set by an output signal "e" of the AND gate 24. An output signal "f" of the F/F 25 is output to the image data control circuit 9 as an ON/OFF signal to turn on/off the second beam B2. The image data control circuit 9 outputs the ON/OFF signal "f" of the F/F 25 to the laser drive circuit 10 as a modulation signal for detecting the second beam B2. The laser drive circuit 10 drives a second semiconductor laser of the light source unit 1 according to the modulation signal "f" for detecting the second beam B2 and thereby the second semiconductor laser is turned on to emit the second beam B2.

When the second beam B2 passes the beam detect device 7, a beam detect signal "b" is output from the binary conversion circuit 12. A gate device 26 as a masking device includes an AND circuit and inputs an output signal "d" of the one-shot multivibrator 22 which is inverted by the inverter 23. Beam detect signals "b" corresponding to the beams B1–B4 from the binary conversion circuit 12 are gated (masked) by the output signal of the inverter 23 and thereby detect signals "g" corresponding to the beams B2–B4 are separated from others.

The beam detect signals "g" corresponding to the beams B2–B4 from the AND circuit 26 are delayed for a minute period of time by a delay circuit 27 and becomes a delayed signal "h". The beam detect signal "g" is delayed for a time which is shorter than a time from the time when the second beam B2 passes until a following third beam B3 passes the beam detect device 7. The level of an output signal from a one-shot multivibrator 28 is made low by a rising edge of a first pulse signal of the output signal "h" from the delay circuit 27. The output signal of the one-shot multivibrator 28 is thereafter kept at a low output level during a predetermined period of time set with the one shot-multivibrator 28 and is then made to a high output level.

The above time set with the one-shot multivibrator 28 is made sufficiently longer than a time for all of the plurality of beams B2–B4 to pass through the beam detect device 7 when the rotating polygon mirror 3 is rotating at a normal rotating speed. The one-shot multivibrator 28 and an inverter 29 constitute a masking signal generating device.

A gate device 30 includes an AND gate and inputs an output signal "i" from the one-shot multivibrator circuit 28 as a gate signal (masking signal). Respective beam detect signals "g" corresponding to beams B2–B4 from the AND circuit 26 are gated (masked) by the gate signal and thereby a beam detect signal corresponding to the second beam B2 is separated from others and is output to the F/F 25 and the image data control circuit 9 as a synchronizing signal "j" corresponding to the second beam B2. The F/F 25 is reset by the output signal "j" from the AND gate 30 and thereby the second beam B2 is turned off.

The image data control circuit 9 outputs image data as an information signal to modulate the second beam B2 to the laser drive circuit 10 in synchronism with the synchronizing signal "j" from the AND gate circuit 30 (a predetermined time later than the synchronizing signal "j") and thereby controls the image formation start timing with the second beam B2 based upon the synchronizing signal "j". The laser drive circuit 10 drives the second semiconductor laser of the light source unit 1 according to the image data as the information signal to modulate the second beam B2, and thereby the second beam B2, modulated according to the image data, is emitted.

Likewise, a F/F 31 operates as a control device to turn on/off a third beam B3. The F/F is set by the output signal "j" of the AND circuit 30. An output signal "k" of the F/F 31 is output to the image data control circuit 9 as an ON/OFF signal to turn on/off the third beam B3. The image data control circuit 9 outputs the ON/OFF signal "k" of the F/F 31 to the laser drive circuit 10 as a modulation signal for detecting the third beam B3. The laser drive circuit 10 drives a third semiconductor laser of the light source unit 1 according to the modulation signal "k" for detecting the third beam B3 and thereby the third semiconductor laser is turned on to emit the third beam B3.

When the third beam B3 passes the beam detect device 7, a beam detect signal "b" is output from the binary conversion circuit 12. A gate device 32 includes an AND gate and inputs the output signal "i" of the one-shot multivibrator 28 which is inverted by the inverter 29. Beam detect signals "g" corresponding to the beams B2–B4 from the AND circuit 26 are gated (masked) by the output signal of the inverter 29, and thereby detect signals "g'" corresponding to the beams B3–B4 are separated from others.

The beam detect signals "g'" corresponding to the beams B3–B4 from the AND circuit 32 are delayed for a minute period of time by a delay circuit 33 as a delaying device. The beam detect signal "g'" is delayed for a time which is shorter than a time from the time when the third beam B3 passes until a following fourth beam B4 passes the beam detect device 7. The level of an output signal from a one-shot multivibrator 34 is made low by a rising edge of a first pulse signal of the output signal from the delay circuit 33. The level of the output signal of the one-shot multivibrator 34 is thereafter kept low during a predetermined period of time set with the one shot-multivibrator 34 and is then made high.

The above time set with the one-shot multivibrator 34 is made sufficiently longer than a time for all of the plurality of beams B3–B4 to pass through the beam detect device 7 when the rotating polygon mirror 3 is rotating at a normal rotating speed. The one-shot multivibrator 34 and an inverter 35 constitute a masking signal generating device.

A gate device 36 includes an AND gate and inputs an output signal from the one-shot multivibrator circuit 34 as a gate signal (masking signal). Respective beam detect signals "g'" corresponding to beams B3–B4 from the AND circuit 32 are gated (masked) by the gate signal and thereby a beam detect signal corresponding to the third beam B3 is separated and is output to the F/F 31 and the image data control circuit 9 as a synchronizing signal corresponding to the third beam B3. The F/F 31 is reset by the output signal from the AND gate 36 and thereby the third beam B3 is turned off.

The image data control circuit 9 outputs image data as an information signal to modulate the third beam B3 to the laser drive circuit 10 in synchronism with the synchronizing signal from the AND circuit 36 (a predetermined time later than the synchronizing signal) and thereby controls the image formation start timing with the third beam B3 based upon the synchronizing signal. The laser drive circuit 10 drives a third semiconductor laser of the light source unit 1 according to the image data as the information signal to modulate the third beam B3, and thereby the third beam B3, modulated according to the image data, is emitted.

A F/F 37 operates as a control device to turn on/off a fourth beam B4. The F/F is set by an output signal of the AND circuit 36. An output signal of the F/F 37 is output to the image data control circuit 9 as an ON/OFF signal to turn on/off the fourth beam B4. The image data control circuit 9 outputs the ON/OFF signal of the F/F 37 to the laser drive circuit 10 as a modulation signal for detecting the fourth beam B4. The laser drive circuit 10 drives a fourth semiconductor laser of the light source unit 1 according to the modulation signal for detecting the fourth beam B4 and thereby the fourth semiconductor laser is turned on to emit the fourth beam B4.

When the fourth beam B4 passes the beam detect device 7, a beam detect signal "b" is output from the binary conversion circuit 12. A gate device 38 includes an AND gate and inputs an output signal of the one-shot multivibrator 34 which is inverted by the inverter 35. Beam detect signals "g'" corresponding to the beams B3–B4 from the AND circuit 32 are gated (masked) by the output signal of the inverter 35 and thereby a detect signal "g''" corresponding to the beam B4 is separated.

The beam detect signal "g''" corresponding to the beam B4 from the AND circuit 38 is delayed for a minute period of time by a delay circuit 39. The beam detect signal "g''" is delayed for a time which is shorter than a time from the time when the fourth beam B3 passes until a following plurality of beams B1–B4 start to be written. The level of an output signal from a one-shot multivibrator 40 is made low by a rising edge of a first pulse signal of the output signal from the delay circuit 39. The level of the output signal of the one-shot multivibrator 40 is thereafter kept low during a predetermined period of time set with the one shot-multivibrator 40 and is then made high.

The above time set with the one-shot multivibrator 40 is made sufficiently longer than a time for the beam B4 to pass through the beam detect device 7 when the rotating polygon mirror 3 is rotating at a normal rotating speed. The one-shot multivibrator 40 constitutes a masking signal generating device.

A gate device 41 includes an AND gate and inputs an output signal from the one-shot multivibrator 40 as a gate signal (masking signal). A beam detect signal "g''" corresponding to the fourth beam B4 from the AND circuit 38 is gated (masked) by the gate signal and thereby a beam detect signal corresponding to the fourth beam B4 is separated and is output to the F/F 37 and the image data control circuit 9 as a synchronizing signal corresponding to the fourth beam B4. The F/F 37 is reset by the output signal from the AND gate 41 and thereby the fourth beam B4 is turned off.

The image data control circuit 9 outputs image data as an information signal to modulate the fourth beam B4 to the laser drive circuit 10 in synchronism with the synchronizing signal from the AND circuit 41 (a predetermined time later than the synchronizing signal) and thereby controls the image formation start timing with the fourth beam B4 based upon the synchronizing signal. The laser drive circuit 10 drives a fourth semiconductor laser of the light source unit 1 according to the image data as the information signal to modulate the fourth beam B4, and thereby the fourth beam B4 modulated according to the image data, is emitted.

A plurality of detect signals generated according to a plurality of beams are thus separated into individual detect signals in a precise manner according to the above-described series of operations and the image writing start position of each beam is controlled according to the corresponding detect signal. Therefore, the image writing start position is controlled in an accurate manner and thereby an image of good quality is obtained.

In the above embodiment, beam detect signals generated according to a plurality of beams are separated into individual detect signals and the image writing start position is controlled according to each separated beam detect signal. Therefore, if the beam detect signals include noise, the image writing start position is deviated, resulting in deteriorating the image quality.

Therefore, it is desired that a masking area to mask a beam detect signal is minimized in order to prevent the beam detect signal from being superposed with noise. Further, in an image forming apparatus such as for example a printer, in which the resolution is changed by changing the rate of rotation of the rotating polygon mirror, a masking time to mask a beam detect signal must be changed according to the rate of rotation of the polygon mirror.

Referring to FIG. 4, the synchronizing signals separating circuit 13 inputs a beam detect signal "b" from the binary conversion circuit 12 as a pulse signal having a plurality of pulses in a row. When the rate of rotation of the polygon mirror increases, a width A and a signal interval B of the beam detect signal "b" are both shortened. Assuming that the delaying times of the delay circuits 21, 27, 33 and 39 are respectively constant, then a beam detect signal "b" having a shorter width A is not masked for a short period of time after the beam detect signal "b" has risen. Therefore, the possibility that the beam detect signal "b" is superposed with noise increases. At the same time, because the signal interval B is also shortened, a rising part of a subsequent beam detect signal may be allowed to be input.

Therefore, delay time setting devices 42–45 change the delaying times of the delay circuits 21, 27, 33 and 39 according to the rate of rotation of the polygon mirror 3 which is input from the polygon mirror rotation number setting circuit 11. The delaying times of the delay circuits 21, 27, 33 and 39 are changed such that the delaying times of the circuits 21, 27, 33 and 39 become shorter as the rate of rotation of the polygon mirror 3 increases. With this arrangement, optimum separation of the beam detect signals according to the rate of rotation of the polygon mirror becomes possible.

As described above, an image forming apparatus according to the above embodiment of the present invention records an image on the photoconductor 4 by scanning the recording medium with the plurality of beams B1–B4 modulated according to individual information signals. The apparatus includes the beam detect device 7 to detect the plurality of beams B1–B4 arriving at respective predetermined positions, and to generate a plurality of detect signals corresponding to the plurality of beams B1–B4, respectively. The apparatus further includes the synchronizing signals generating circuit 8 to separate the plurality of beam detect signals into individual beam detect signals. An image formation start timing for each beam is controlled according to each beam detect signal separated from each other beam detect signal by the beam detect signals separating device 8. The beam detect signals separating device 8 includes the delay circuits 21, 27, 33, 39 as delaying devices to delay a beam detect signal from the beam detect device 7, and the AND gates 24, 26, 30, 32, 36, 38, 41, the one-shot multivibrator 22, 28, 34, 40 and the inverters 23, 29, 35 as a separating device to separate a plurality of beam detect signals corresponding to the plurality of beams by generating a plurality of masking signals corresponding to the plurality of beam detect signals according to signals from the delaying devices 21, 27, 33, 39, and by masking the plurality of beam detect signals with the plurality of masking signals, and the delay time setting devices 42–45 to set and change a delaying time of the delaying devices. Therefore, the image forming apparatus of the present invention can control the image writing start position in a precise manner and 13 thereby an image of good quality can be obtained even with a single beam detect device. Further, by setting the optimum masking time, the beam detect signal is prevented from being superposed with noise and thereby the image writing start position can be controlled in an accurate manner. The good quality image can be therefore obtained in a stable manner.

The image forming apparatus of the present invention further includes the rotating polygon mirror 3 to deflect a plurality beams and the polygon mirror rotation number setting circuit 11 to set and change the rate of rotation of the polygon mirror 3. The delay time setting devices 42–45 change the delaying time for the delaying devices 21, 27, 33, 39 according to the rate of rotation of the polygon mirror 3 set by the polygon mirror rotation number setting device 11. Therefore, even when the rate of rotation of the polygon mirror 3 is changed according to a change of the resolution, the delaying times of the delaying devices 21, 27, 33, 39 can be changed to optimum delaying times according to the rate of rotation of the polygon mirror 3 and thereby the beam detect signals can be separated into individual detect signals in a precise manner and the image writing start position can be controlled to an optimum position.

The image forming apparatus of the present invention further includes the F/F 20, 25, 31, 37 as control devices to turn off a beam incident on the beam detect device 7 and turn on a subsequent beam immediately after the initial beam is detected by the beam detect device 7. Therefore, the plurality of beams will not be turned on at the same time and thereby the plurality of beam detect signals can be separated into individual detect signals in a precise manner.

It is needless to say that, although four beams are used in the above embodiment, the present invention can be applied to an image forming apparatus having more than four beams.

Numerous additional modifications and variations of the present invention are possible in light of the above teachings. It is therefore to be understood that within the scope of the appended claims, the present invention may be practiced otherwise than as specifically described herein.

What is claimed as new and desired to be secured by Letters Patent if the United States is:

1. An image forming apparatus which records an image on a recording medium by scanning the recording medium with a plurality of beams modulated according to individual information signals, comprising:
   a beam detect device to detect the plurality of beams arriving at the beam detect device, and to generate a plurality of beam detect signals corresponding to the plurality of beams respectively;
   a beam detect signals separating device to separate the plurality of beam detect signals into individual beam detect signals; and
   a control device to turn off a first beam of the plurality of beams incident on the beam detect device and to turn on a subsequent beam of the plurality of beams, immediately after the first beam is detected by the beam detect device,
   wherein, an image formation start timing for each beam is controlled by said control device according to each beam detect signal separated from others by the beam detect signals separating device.

2. The image forming apparatus of claim 1, wherein the beam detect signals separating device includes a delaying device to delay the plurality of beam detect signals from the beam detect device, and a separating device to separate the plurality of beam detect signals, corresponding to the plurality of beams, into individual beam detect signals by generating a plurality of masking signals corresponding to the plurality of beam detect signals according to signals from the delaying device and by masking the plurality of beam detect signals from the beam detect device with the plurality of masking signals, respectively.

3. The image forming apparatus of claim 2, wherein the beam detect signals separating device further includes a delay time setting device to set and change a delaying time of the delaying device.

4. The image forming apparatus of claim 3, further comprising:
   a rotating polygon mirror to deflect the plurality of beams; and
   a setting device to set and change the number of rotation of the rotating polygon mirror;
   wherein, the delay time setting device changes the delaying time according to the number of rotation of the rotating polygon mirror.

5. An image forming apparatus which records an image on a recording medium by scanning the recording medium with a plurality of beams modulated according to individual information signals, comprising:
   means for detecting the plurality of beams arriving at respective predetermined positions on the means for detecting the plurality of beams, and generating a plurality of beam detect signals corresponding to the plurality of beams, respectively;
   means for separating the plurality of beam detect signals into individual beam detect signals; and
   means for turning off a first beam of the plurality of beams incident on the beam detect means and turning on a subsequent beam of the plurality of beams, immediately after the first beam is detected by the beam detect means,
   wherein, an image formation start timing for each beam is controlled by said means for controlling according to each beam detect signal separated from others by the beam detect signals separating means.

6. The image forming apparatus of claim 5, wherein the beam detect signals separating means includes means for delaying the plurality of beam detect signals from the beam detect means and means for separating the plurality of beam detect signals corresponding to the plurality of beams by generating a plurality of masking signals corresponding to the plurality of beam detect signals according to signals from the delaying means and by masking the plurality of beam detect signals from the beam detect means with the plurality of masking signals, respectively.

7. The image forming apparatus of claim 6, wherein the beam detect signals separating device further includes means for setting and changing a delaying time of the delaying means.

8. The image forming apparatus of claim 7, further comprising:
   means for deflecting the plurality of beams; and
   means for setting and changing the number of rotation of the deflecting means;
   wherein, the delay time setting means changes the delaying time according to the number of rotation of the deflecting means.

9. An image forming method of recording an image on a recording medium by scanning the recording medium with a plurality of beams modulated according to individual information signals, comprising steps of:
   detecting the plurality of beams arriving at respective predetermined positions on a beam detect device and generating a plurality of beam detect signals corresponding to the plurality of beams, respectively;
   separating the plurality of beam detect signals into individual beam detect signals;
   turning off a first beam of the plurality of beams incident on the beam detect device and turning on a subsequent beam of the plurality of beams, immediately after the first beam is detected by the beam detect device; and
   controlling an image formation start timing for each beam according to each beam detect signal separated from others at the beam detect signals separating step.

10. The image forming method of claim 9, wherein the beam detect signals separating step includes a step of delaying the plurality of beam detect signals, a step of separating the plurality of beam detect signals corresponding to the plurality of beams into individual detect signals by generating a plurality of masking signals corresponding to the plurality of beam detect signals according to the signals delayed at the delaying step and by masking the plurality of beam detect signals with the plurality of masking signals, respectively, and a step of setting and changing a delaying time for delaying the plurality of detect signals.

11. The image forming method of claim 10, further comprising steps of:
   deflecting the plurality of beams with a deflecting device;
   setting and changing the number of rotation of the deflecting device; and
   changing the delaying time to delay the plurality of detect signals according to the number of rotation of the deflecting device.

* * * * *